United States Patent

Haus

[15] 3,683,078
[45] Aug. 8, 1972

[54] TRANSPARENT TOXICANT COMPOSITIONS

[72] Inventor: Joseph Benjamin Haus, Clifton, N.J.

[73] Assignee: CPC International Inc.

[22] Filed: Oct. 13, 1969

[21] Appl. No.: 866,034

[52] U.S. Cl. .................. 424/190, 424/192, 424/193, 424/200, 424/213, 424/300, 424/306, 424/352, 424/358
[51] Int. Cl. ......................... A01n 9/08, A01n 17/10
[58] Field of Search......424/358, 192, 193, 190, 306, 424/200, 300, 352, 213

[56] References Cited

UNITED STATES PATENTS

| | | | |
|---|---|---|---|
| 2,872,368 | 2/1959 | Sanders et al. | 424/358 |
| 3,172,750 | 3/1965 | Altscher et al. | 424/358 |

Primary Examiner—Sam Rosen
Attorney—Frank E. Robbins, Joseph Shekleton, Janet E. Price, Robert D. Weist, Martha A. Michaels and Dorothy R. Thumler

[57] ABSTRACT

The emulsifier compositions containing an alkyl phenol/alkylene oxide condensation product, or ether thereof, a sulfonate salt, and an alcohol/alkylene oxide condensation product, are useful in the preparation of toxicant concentrates which can in turn be used to prepare transparent toxicant emulsions.

28 Claims, No Drawings

TRANSPARENT TOXICANT COMPOSITIONS

This invention relates to emulsifier compositions and to toxicant concentrates containing such emulsifier compositions. The emulsifier compositions contain little or none of the hydrocarbon solvent contained in prior art emulsifier compositions used as toxicant carriers. They are, thus, suitable for the preparation of non-phytotoxic insecticidal compositions intended to be sprayed onto vegetables, fruits, trees and other living matter. The compositions of this invention are intended to be used where prior art emulsifier solvent compositions have been used and represent an improvement over those emulsifier solvent compositions.

The compositions of the prior art containing both emulsifier and solvent, although producing excellent dispersions in aqueous media for application to plants, insects, etc., tend to separate into layers or to thicken. This is particularly the case where said compositions stand over a period of time and is aggravated by low temperatures. While this does not destroy their ultimate usefulness, it renders difficult their handling and also presents serious problems with respect to the appearance of the compositions. None of these is a serious problem in itself, but in combination they add up to a significant problem which has attracted the attention of many in the art. Most insecticides, herbicides, fungicides, disinfectants, germicides and weed killers are applied in the form of a liquid emulsion. In some instances application is in the form of a dust or powder, but a liquid application is much more convenient and desirable and resort to the use of a powder or dust invariably is a second choice. The application of a liquid formulation requires the active toxicant to be dispersed uniformly throughout the liquid and, since most of the toxicant materials are molecules of large molecular weight and are accordingly insoluble in water, this means that they must be dissolved in an organic solvent or dispersed in an aqueous emulsion. Where it is necessary to apply the toxicant material to a living plant or animal, the former is contraindicated because of the organic solvent which would have a serious adverse effect upon the living organism. This means in turn that the great preponderance of toxicant materials are applied in the form of aqueous emulsions.

Accordingly, it is an object of the present invention to provide novel emulsifier compositions suitable for use as toxicant carriers.

Another object of the present invention is to provide toxicant compositions produced from such emulsifier compositions.

Still another object of the present invention is to provide aqueous emulsifier compositions which are non-phytotoxic.

These and other objects are attained by a composition comprising in combination from about 10 to about 75 parts of an alkyl phenol/alkylene oxide adduct, or ether thereof, wherein the product has at least 8 alkylene oxide units in its molecular structure, a calcium, magnesium amine or ammonium sulfonate, and a polyoxyalkylene ether. This composition can be blended with virtually all known toxicants to form toxicant concentrates which in turn can be used to prepare transparent emulsions suitable for application to plants, etc. With respect to those toxicants which are not themselves phytotoxic, the resulting transparent emulsion is non-phytotoxic.

The alkyl phenol/alkylene oxide condensation products are available from well-known processes and may be represented by the formula:

$$R_x-Ar-(OR')_yOH$$

where R is an aliphatic hydrocarbon radical large enough to provide a significant hydrophobic character to the molecule, having at least about five carbon atoms, $x$ is 1, 2 or 3, Ar is a benzene or naphthalene ring, R' is an alkylene radical having fewer than five carbon atoms, and $y$ is an integer of about 8 to about 20. The reaction of an alkyl phenol with ethylene oxide, for example, proceeds readily in the presence of any of several known catalysts to yield the desired condensation product wherein the first molecule of alkylene oxide adds onto the phenolic hydroxy group and succeeding alkylene oxide molecules add on to the hydroxy group which results from the previous alkylene oxide reaction. The result is a chain of alkylene oxide units and the products useful herein are those which contain at least eight such alkylene oxide units. As many as twenty alkylene oxide units may be present in a suitable product. Preferred products are those having from 8 to 12 alkylene oxide units. The alkylene group may be ethylene, propylene, and others up to those having four carbon atoms, but ethylene and propylene are referred because of the ready availability of ethylene oxide and propylene oxide and also because of the particular efficacy of products resulting from the use of these reactants. The relative proportion of these alkyl phenol/alkylene oxide condensation products used in the colloidal dispersions herein ranges from about 10 to about 75 percent based on the weight of the combined three ingredients above. The alkyl groups should be large enough to provide a significant hydrophobic character to the molecule. It should have at least about five carbon atoms. There may be 1, 2 or 3 alkyl groups per benzene ring.

The calcium, magnesium, amine or ammonium sulfonate ingredient of the combination may be selected from a wide variety of sulfonates. Salts of mahogany acids or green acids may be used, as may sulfonates derived from other petroleum fractions, e.g., paraffins or unsaturated wax. Salts of synthetic sulfonates, however, are preferred because of their availability. Alkyl aromatic sulfonates are especially available and these include dodecyl benzene sulfonic acid, wax-substituted naphthalene sulfonic acid, polydodecyl benzene sulfonic acid and eicosyl benzene sulfonic acid. Generally, the aromatic ring in such compounds is benzene or naphthalene, usually benzene, and the aliphatic substituent on that ring is an alkyl group having at least about 8 carbon atoms. The relative proportion of sulfonate in the combination herein will range from about 10 to about 40 percent, based on the weight of the combination of three ingredients above. Calcium sulfonates are preferred.

The polyoxyalkylene ether may be prepared by reaction of a low molecular weight alkylene oxide such as ethylene oxide or propylene oxide or mixtures thereof with a low molecular weight alcohol such as methyl, ethyl, or butyl alcohols. The molecular weight of this material is within the range of from about 1,000 to about 6,000. An example is a polyoxyalkylene derivative of n-butyl alcohol having a molecular weight of about 2,500. The relative proportion of this ingredient is within the range of from about 10 to about 75 percent, based on the weight of the combination of the three ingredients above. The formula of such polyoxyalkylene ether is as follows:

$$R'' - (OR')_z OH$$

where R'' is lower alkyl, R' is an alkylene radical having fewer than five carbon atoms, and z is an integer of at least about 15.

The emulsifier compositions herein are particularly useful in the preparation of pyrethroid concentrates from which can be prepared transparent pyrethroid emulsions. Any of the well-known pyrethroids, e.g., allethrin, bioallethrin, neopynamin and barthrin, are readily dispersed by these emulsifier compositions. Insecticides frequently are used in combination with so-called synergists which act to enhance the insecticidal activity of the insecticide and such synergists are compatible in the toxicant concentrates and transparent emulsions of this invention.

The amount of toxicant which is to be added to these emulsifier combinations will vary, depending on the particular toxicant. Thus, a relatively large proportion of chlordane will be used whereas a relatively small proportion of pyrethrum will be used. One reason for the use of only a small proportion of pyrethrum is that this toxicant is available only as a kerosene solution and the addition of a large amount of pyrethrum to the colloidal dispersion herein would incorporate a proportionally very large amount of kerosene and thus make it impossible to prepare transparent toxicant emulsions. In any event, the relative proportion of toxicant to be employed with the emulsifier composition may range from about 2 percent to about 75 percent, the rest being emulsifier composition, i.e., from about 25 percent to about 95 percent.

Illustrative examples of colloidal dispersions are as follows:

|  |  |  | Parts |
|---|---|---|---|
| 1. | (a) | $C_9H_{19}C_6H_4(OC_2H_4)_{10}OH$ | 16 |
|  | (b) | $[C_{12}H_{25}C_6H_4SO_3]_2Ca$ | 27 |
|  | (c) | $CH_3(OC_2H_4)_{36}OH$ | 57 |
| 2. | (a) | $C_9H_{19}C_6H_4(OC_2H_4)_{14}OH$ | 10 |
|  | (b) | $[(C_{12}H_{25})_2C_6H_3SO_3]_2Ca$ | 30 |
|  | (c) | $n-C_4H_9(OC_3H_7)_{25}OH$ | 60 |
| 3. | (a) | Wax $C_6H_4(OC_2H_4)_{14}OH$ | 20 |
|  | (b) | $[C_{18}H_{37}C_6H_4SO_3]_2$ Ca | 25 |
|  | (c) | $n-C_{10}H<(OC_2H_4)_{50}OH$ | 55 |
| 4. | (a) | $(C_5H_{11})_2C_6H_3(OC_2H_4)_xOH$ | 24 |
|  | (b) | [Wax $C_{10}H_6SO_3]_2$ Mg | 35 |
|  | (c) | $CH_3(OC_2H_4)_{20}OH$ | 41 |
| 5. | (a) | $C_{12}H_{25}C_{10}H_6(OC_3H_7)_{14}OH$ | 12 |
|  | (b) | $[C_{10}H_{21}C_6H_4SO_3]_2$ Ca | 22 |
|  | (c) | $C_4H_9(OC_2H_4)_{75}OH$ | 66 |
| 6. | (a) | $C_9H_{19}C_6H_4(OC_2H_4)_{20}OH$ | 50 |
|  | (b) | Ammonium mahogany sulfonate | 30 |
|  | (c) | $C_2H_5(OC_2H_4)_{30}OH$ | 20 |
| 7. | (a) | $C_{12}H_{25}C_6H_4(OC_3H_7)_{10}OH$ | 40 |
|  | (b) | Pyridine mahogany sulfonate | 30 |
|  | (c) | $C_2H_5(OC_2H_4)_{35}OH$ | 30 |
| 8. | (a) | $C_8H_{17}C_6H_4(OC_2H_4)_{13}OH$ | 75 |
|  | (b) | $(C_{12}H_{25}C_6H_4SO_3)_2Ca$ | 15 |
|  | (c) | $CH_3(OC_2H_4)_{40}OH$ | 10 |

Illustrative examples of combinations of the emulsifier compositions and various toxicants are as follows:

|  |  | Parts |
|---|---|---|
| 9. | Pyrethrum, as a 20% kerosene solution | 16 |
|  | Piperonyl Butoxide | 3.2 |
|  | The emulsifier composition of Ex. 1 | 81.8 |
| 10. | Chlordane | 60 |
|  | The emulsifier composition of Ex. 2 | 40 |
| 11. | Cis-trans (±) 5-benzyl-3-furyl methyl chrysanthemate | 12 |
|  | Methyl p-hydroxybenzoate | 10 |
|  | The emulsifier composition of Ex. 6 | 78 |
| 12. | Malathion | 25 |
|  | The emulsifier composition of Ex. 5 | 75 |
| 13. | Dieldrin | 10 |
|  | Acetone | 10 |
|  | The emulsifier composition of Ex. 3 | 80 |
| 14. | Iodine | 10 |
|  | The emulsifier composition of Ex. 2 | 90 |
| 15. | Baygon, i.e., 2-isopropoxyphenyl-N-methylcarbamate | 10 |
|  | Methyl alcohol | 12 |
|  | The emulsifier composition of Ex. 5 | 78 |
| 16. | Sevin, i.e., 1-naphthyl-N-methylcarbamate | 2.5 |
|  | Hexachlorophene | 2.5 |
|  | The emulsifier composition of Ex. 7 | 95 |
| 17. | Captan, i.e., N-(trichloromethylthio)-4-cyclohexene-1,2-dicarboximide | 2.5 |
|  | The emulsifier composition of Ex. 5 | 97.5 |
| 18. | Dursban, i.e., O,O-Diethyl-0-(3,5,6-trichloro-2-pyridyl) phosphorothioate | 10 |
|  | Xylene | 5 |
|  | The emulsifier composition of Ex. 1 | 85 |

Ultimate use of the toxicant concentrates illustrated by Examples 9 – 17 is by way of dilution in water and application of the resulting transparent water emulsion. The extent of dilution is such as to result in an aqueous emulsion containing from about 0.01 percent to about 5 percent of the active toxicant ingredient. As indicated earlier, these transparent emulsions are nonphytotoxic, i.e., they are not injurious to plants or animal life. They can be applied not only to growing plants, but also to animals, e.g., pet sprays and dips. Furthermore, they are not flammable, nor are they subject to freezing and thawing with separation of phases. Their intended toxicant activity, i.e., as an insecticide, herbicide, fungicide, etc., is of the same order of effectiveness as their prior art predecessors. Thus, an insecticidal composition prepared by diluting the toxicant concentrate of Example 9 with water is effective to kill flies.

Mixtures of any two or more of any of the three ingredients of the colloidal dispersion may be used in the combination. Also, additional ingredients may be employed in particular circumstances. Thus, where a particular toxicant may present solubility problems, very small amounts of organic solvents such as methanol, isopropyl alcohol, or even kerosene or xylene and the like, may be used to facilitate incorporation of the toxicant into colloidal dispersion.

All parts herein, unless otherwise expressly stated, are by weight.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A toxicant concentrate comprising in combination from about 2 to about 75 parts of a toxicant and from about 25 to about 98 parts of water soluble to water dispersible emulsifier composition comprising:

a. from about 10 to about 75 parts of a polyoxyalkylene ether of an alkyl phenolic compound having the formula:

$$R_x\text{—Ar—}(OR')_y OH$$

where R is an aliphatic hydrocarbon radical large enough to provide a significant hydrophobic character to the molecule, having at least about five carbon atoms, $x$ is 1, 2 or 3, Ar is a benzene or naphthalene ring, R' is an alkylene radical having fewer than five carbon atoms, and $y$ is an integer of from about 8 to about 20;

b. from about 10 to about 40 parts of a calcium, magnesium, amine or ammonium sulfonate selected from the class consisting of mahogany sulfonates, green acid salts, paraffin sulfonates, unsaturated wax sulfonates, alkyl benzene sulfonates and alkyl naphthalene sulfonates; and c. from about 10 parts to about 75 parts of a polyoxyalkylene ether having an average molecular weight of from about 1,000 to about 6,000 and having the formula:

$$R''\text{—}(OR')_z OH$$

where R'' is lower alkyl, R' is an alkylene radical having fewer than five carbon atoms, and $z$ is an integer of at least about 15.

2. A toxicant concentrate as in claim 1 wherein the toxicant is pyrethrum.

3. A toxicant concentrate as in claim 1 wherein the toxicant is Dursban.

4. A toxicant concentrate as in claim 1 wherein the toxicant is a pyrethroid.

5. A toxicant concentrate as in claim 1 wherein the toxicant is cis-trans (±) 5-benzyl-3-furyl methyl chrysanthemate.

6. A toxicant concentrate as in claim 1 wherein the toxicant is Baygon.

7. A toxicant concentrate as in claim 1 wherein the toxicant ingredient comprises 2 or more toxicants.

8. A toxicant concentrate as in claim 1 where R' of component (a) is ethylene.

9. A toxicant concentrate as in claim 1 wherein component (b) is calcium sulfonate.

10. A toxicant concentrate as in claim 1 wherein component (b) is calcium dodecyl benzene sulfonate.

11. A toxicant concentrate as in claim 1 wherein component (b) is calcium petroleum sulfonate.

12. A toxicant concentrate as in claim 1 wherein R'' of component (c) is a butyl radical.

13. A toxicant concentrate as in claim 1 wherein R'' of component (c) is methyl.

14. A toxicant concentrate as in claim 1 wherein R'' of component (c) is hydrogen.

15. A toxicant concentrate as in claim 1 wherein R' of component (c) is ethylene.

16. A toxicant concentrate as in claim 1 wherein R' of component (c) is propylene.

17. A toxicant concentrate as in claim 1 wherein $z$ of component (c) is within the range of from about 15 to about 100.

18. A toxicant composition comprising a non-phytotoxic, transparent solution of the toxicant concentrate of claim 1 in water, the concentration of said toxicant concentrate being such as to provide from about 0.01 percent to about 5.0 percent of active toxicant material in the water solution.

19. A toxicant concentrate comprising in combination from about 2 to about 75 parts of a toxicant and from about 25 to about 98 parts of an emulsifier composition comprising:

a. from about 10 to about 75 parts of a polyoxyalkylene ether of an alkyl phenolic compound having the formula:

$$R_x\text{—Ar—}(OR')_y OH$$

where R is an alkyl radical large enough to provide a significant hydrocarbon character to the molecule, having at least about five carbon atoms, $x$ is 1, 2 or 3, Ar is a benzene ring, R' is ethylene or propylene, R'' is hydrogen or lower alkyl and $y$ is an integer of from about 8 to about 20;

b. from about 10 to about 40 parts of calcium dodecyl benzene sulfonate; and c. from about 10 to about 75 parts of a polyoxyalkylene ether having an average molecular weight of from about 1,000 to about 6,000 and having the formula:

$$R''(OR')_z OH$$

where R' is ethylene or propylene, $R_{41}$ is lower alkyl and $z$ is an integer of at least about 15.

20. A toxicant concentrate as in claim 19 wherein the toxicant is the combination of pyrethrum and a synergist.

21. A toxicant concentrate as in claim 19 wherein the toxicant is chlordane.

22. A toxicant concentrate as in claim 19 wherein the toxicant is cis-trans (±) 5-benzyl-3-furyl methyl chrysanthemate.

23. A toxicant concentrate as in claim 19 wherein the toxicant is Malathion.

24. A toxicant concentrate as in claim 19 wherein the toxicant ingredient comprises 2 or more toxicants.

25. A toxicant composition comprising a non-phytotoxic, transparent solution of the toxicant concentrate of claim 19 in water, the concentration of said toxicant concentrate being such as to provide from about 0.01 percent to about 5.0 percent of active toxicant material in the water solution.

26. A method for reducing infestation of insects comprising applying to said insects or to the environment of infestation the toxicant composition of claim 25.

27. A method for reducing infestation of insects comprising applying to said insects or to the environment of infestation the toxicant composition of claim 18.

28. A method of disinfecting a surface comprising applying to said surface the toxicant composition of claim 25.

* * * * *